United States Patent
Fritsch et al.

(10) Patent No.: US 10,622,866 B2
(45) Date of Patent: Apr. 14, 2020

(54) ELECTRICALLY DRIVEN DEVICE

(71) Applicant: Braun GmbH, Kronberg (DE)

(72) Inventors: Thomas Fritsch, Eppstein (DE);
Andreas Kramp, Bad Camberg (DE);
Norbert Schaefer, Frankfurt am Main (DE)

(73) Assignee: BRAUN GMBH, Kronberg (DE)

( * ) Notice: Subject to any disclaimer, the term of this patent is extended or adjusted under 35 U.S.C. 154(b) by 386 days.

(21) Appl. No.: 15/715,126

(22) Filed: Sep. 25, 2017

(65) Prior Publication Data

US 2018/0091019 A1 Mar. 29, 2018

(30) Foreign Application Priority Data

Sep. 28, 2016 (EP) ..................................... 16191027

(51) Int. Cl.
*H02K 7/075* (2006.01)
*A61C 17/34* (2006.01)
(Continued)

(52) U.S. Cl.
CPC .............. *H02K 7/075* (2013.01); *A61C 1/185* (2013.01); *A61C 17/221* (2013.01);
(Continued)

(58) Field of Classification Search
CPC .......... H02K 7/075; H02K 5/10; A61C 1/185; A61C 17/221; A61C 17/225; A61C 17/34; F16H 21/40; F16H 21/50
(Continued)

(56) References Cited

U.S. PATENT DOCUMENTS

| 3,233,265 A | 2/1966 | Hartmann |
| 3,474,795 A | 10/1969 | Hantman |

(Continued)

FOREIGN PATENT DOCUMENTS

| DE | 3544256 A1 | 6/1987 |
| JP | H09177923 | 7/1997 |

(Continued)

OTHER PUBLICATIONS

PCT/IB2017/055342 International Search Report with written opinion; dated Nov. 3, 2017, 13 pages.

*Primary Examiner* — Jeremy A Luks
(74) *Attorney, Agent, or Firm* — Vladimir Vitenberg

(57) ABSTRACT

An electrically driven device includes a housing, an electric motor with a drive shaft having a first rotary axis and a drive pin connected to the drive shaft eccentrically with respect to the rotary axis, and a driven shaft having a second rotary axis and mounted in the housing for a pivoting about the second rotary axis. The driven shaft is indirectly coupled to the drive shaft by a gear mechanism converting a rotary motion of the drive shaft into a reciprocating pivoting motion of the driven shaft. The gear mechanism includes a cross slider having a sliding support extending perpendicular to the first rotary axis and receiving the drive pin. The cross slider is guided in the housing by a parallel lever in the form of a parallelogram by at least two pivotable links. The driven shaft is coupled to the cross slider by one of the said links, thereby converting a rotary motion of the drive shaft into a reciprocating pivoting of the driven shaft.

15 Claims, 2 Drawing Sheets

(51) Int. Cl.
*H02K 5/10* (2006.01)
*A61C 17/22* (2006.01)
*A61C 1/18* (2006.01)

(52) U.S. Cl.
CPC ............ *A61C 17/225* (2013.01); *A61C 17/34* (2013.01); *H02K 5/10* (2013.01)

(58) Field of Classification Search
USPC ................. 310/80; 74/25, 45, 48, 49, 50
See application file for complete search history.

(56) References Cited

U.S. PATENT DOCUMENTS

| | | |
|---|---|---|
| 3,562,566 A | 2/1971 | Kircher |
| 3,699,952 A | 10/1972 | Waters |
| 4,506,400 A | 3/1985 | Klein |
| 4,628,605 A | 12/1986 | Clowers |
| 5,283,921 A | 2/1994 | Ng |
| 5,311,633 A | 5/1994 | Herzog |
| 5,381,576 A | 1/1995 | Hwang |
| 5,689,850 A | 11/1997 | Shekalim |
| 5,769,102 A * | 6/1998 | Zebuhr ................ A61C 15/047 132/322 |
| 5,822,821 A | 10/1998 | Sham |
| 5,974,615 A | 11/1999 | Schwarz-hartmann |
| 6,237,178 B1 | 5/2001 | Krammer |
| 6,363,565 B1 * | 4/2002 | Paffrath .................. A46B 9/04 15/22.1 |
| 7,120,960 B2 | 10/2006 | Hilscher |
| 7,614,107 B2 | 11/2009 | Cobabe |
| 7,636,976 B2 | 12/2009 | Banning |
| 7,810,200 B2 | 10/2010 | Fujimoto |
| 7,861,348 B2 | 1/2011 | Chan |
| 8,256,055 B2 | 9/2012 | Kressner |
| 8,443,476 B2 | 5/2013 | Hilscher |
| 8,701,235 B2 * | 4/2014 | Kressner ............ A61C 17/3472 15/22.1 |
| 8,875,335 B2 | 11/2014 | Kloster |
| 8,943,634 B2 | 2/2015 | Sokol |
| 9,089,390 B2 * | 7/2015 | Klemm .................. A61C 17/22 |
| 2003/0131427 A1 | 7/2003 | Hilscher |
| 2006/0027266 A1 | 2/2006 | Kim |
| 2006/0101598 A1 | 5/2006 | Fujimoto |
| 2010/0089414 A1 | 4/2010 | Wyatt |
| 2012/0284937 A1 | 11/2012 | Kloster |
| 2015/0173874 A1 | 6/2015 | Johnson |
| 2018/0087631 A1 | 3/2018 | Kramp |
| 2018/0087632 A1 | 3/2018 | Fritsch |
| 2018/0087633 A1 | 3/2018 | Fritsch |
| 2018/0091018 A1 | 3/2018 | Fritsch |

FOREIGN PATENT DOCUMENTS

| | | |
|---|---|---|
| JP | 2001198145 | 7/2001 |
| JP | 2013226202 | 11/2013 |
| KR | 20080069373 | 7/2008 |
| WO | WO2011077285 | 6/2011 |

* cited by examiner

ELECTRICALLY DRIVEN DEVICE

FIELD OF THE INVENTION

The present invention is concerned with an electrically driven device, for example an electric toothbrush, an electric hair-removal device, or an electric skin-treatment device.

BACKGROUND OF THE INVENTION

An electric toothbrush with a drive mechanism comprising gearwheels is known for example from DE 39 37 854 A1. The drive mechanism converts a continuous rotary movement of the drive shaft of an electric motor into a reciprocating pivoting of a driven shaft. EP 0 850 027 B1 and EP 1 357 854 B1 disclose further drive mechanisms with gearwheels wherein the mechanisms further generate an additional pivoting of the drive shaft about a swiveling axis. The use of gearwheels may contribute to increased sound emissions.

US 2006/0101598 A1 discloses an electric toothbrush with a scotch yoke mechanism converting a continuous rotary movement of the drive shaft of an electric motor into a reciprocating longitudinal displacement of a driven shaft.

Further, U.S. Pat. No. 5,381,576 describes an electric toothbrush comprising a housing, an electric motor with a drive shaft having a first rotary axis and a drive pin connected to the drive shaft eccentrically with respect to the rotary axis, and a driven shaft having a second rotary axis and mounted in the housing for performing a pivoting about the second rotary axis. The driven shaft is indirectly coupled to the drive pin by a gear mechanism converting a rotary motion of the drive shaft into a reciprocating pivoting of the driven shaft. The gear mechanism comprises an elastically deformable transmission member.

WO 2006/130643 A2 discloses an electrically driven apparatus for applying a cosmetic comprising a mechanism for converting a rotary motion of a drive shaft into a reciprocating pivoting motion of a driven shaft about its longitudinal axis. The mechanism comprises a rod with a longitudinal slot receiving an eccentrically arranged pin. The rod is connected to the driven shaft by means of a further rod.

U.S. Pat. No. 5,822,821 and EP 0 110 327 A2 disclose electrically driven toothbrushes comprising a scotch yoke mechanism for converting a rotary motion of a drive shaft into a reciprocating pivoting motion of a driven shaft about its longitudinal axis.

It is an object of the present disclosure to provide an electrically driven device with reduced sound emissions. It is a further object to provide a less complex electrically driven device with a reduced number of component parts.

SUMMARY OF THE INVENTION

In accordance with one aspect there is provided an electrically driven device comprising a housing, an electric motor mounted in the housing and comprising a drive shaft having a first rotary axis, a driven shaft having a second axis and mounted in the housing for performing a movement relative to the housing. The driven shaft may be indirectly coupled to the drive shaft by means of a gear mechanism, for example a gear mechanism comprising a scotch yoke mechanism, i.e. a slotted link mechanism, converting a rotary motion of the drive shaft into a reciprocating pivoting motion of the driven shaft. A drive pin may be connected to the drive shaft eccentrically with respect to the rotary axis. The gear mechanism comprises a cross slider having a sliding support which extends perpendicular to the first rotary axis and which receives the drive pin. The cross slider is guided in the housing by means of at least two pivotable links which may be directly coupled to the housing or indirectly, e.g. via an adapter and/or a spring. The driven shaft is coupled to the cross slider by means of one of the at least two pivotable links thereby converting a rotary motion of the drive shaft into a reciprocating pivoting of the driven shaft. The eccentric drive pin may be directly connected to the drive shaft or may be indirectly connected to the drive shaft, e.g. by means of one or more interposed elements and/or a gear.

The electrically driven device may be a platform for different applications, for example as a toothbrush, as a skin-treatment device, or as a hair-removal device.

DETAILED DESCRIPTION OF THE INVENTION

Figures 1, 2:
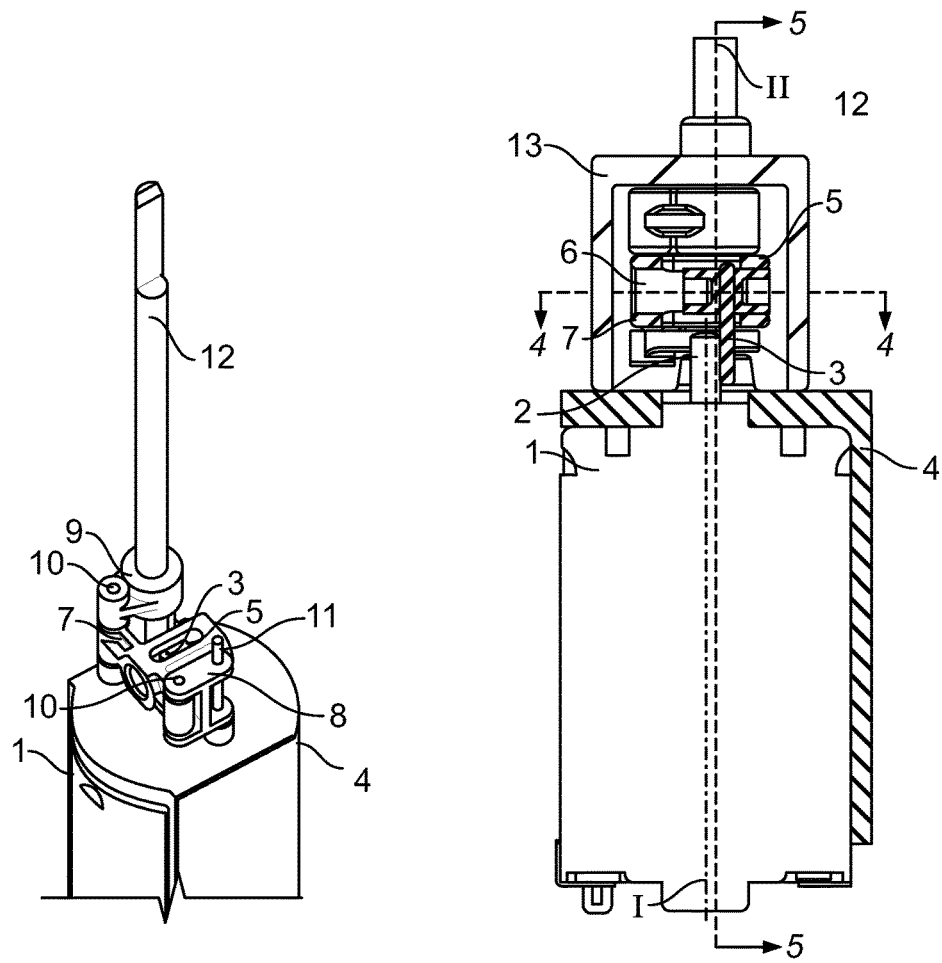
FIG. 1 shows a perspective view of a device according to a first embodiment.
FIG. 2 shows a sectional view of the device of FIG. 1.
Figure 3:
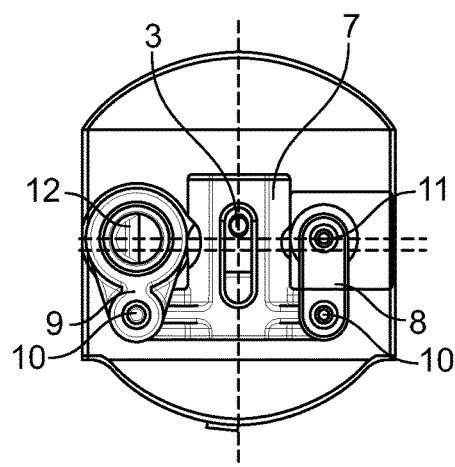
FIG. 3 shows a top view of the device of FIG. 1.
Figure 4:
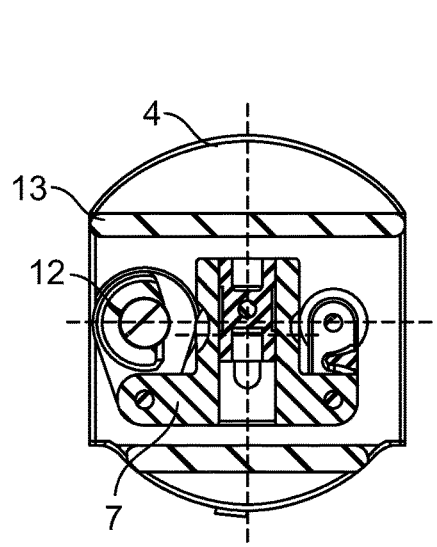
FIG. 4 shows a sectional view of the device of FIG. 1 along line C-C in FIG. 2.

Current toothbrush drive systems performing an oscillating pivoting of the cleaning element, e.g. a bristle, are perceived as being too loud. In particular, it is desirable to provide an electrically driven device with sound emissions below 55 dB (A) sound power level, especially at current drive frequency of 83 Hz. An important factor for noise is the form of the motion over time. The velocity is the first derivative of the displacement, the acceleration the second derivative of the motion. Higher accelerations and therefore inertia forces occur if the wave form is not a sine wave or harmonic. These periodic forces translate into bearing reaction forces and thus create an excitation to the structure of the device and this can cause undesired noise of elements oscillating in their natural frequency. Another source of noise is two bodies hitting each other and creating a rattling noise. This occurs for example in cam driven systems.

In accordance with one aspect, a gear mechanism is provided converting a rotary motion of the drive shaft into a reciprocating pivoting of the driven shaft, preferably a sinusoidal movement of the driven shaft or a substantially sinusoidal movement of the driven shaft. This contributes in reducing the noise generated in use of the device.

According to an aspect, the gear mechanism comprises a scotch yoke mechanism with the cross slider being guided in the housing by means of at least two pivotable links. The scotch yoke mechanism of the gear mechanism may convert a continuous rotary motion of the drive shaft into a sinusoidal reciprocating movement of the cross slider. For example, the gear mechanism converts a continuous rotary motion of the drive shaft into a sinusoidal or a substantially sinusoidal reciprocating rotation of the driven shaft. The movement of the cross slider may be a rotational motion which may be close to a linear motion guided by a parallel lever design in the form of a parallelogram by means of the at least two pivotable links. For example, each of the at least two pivotable links is pivotably hinged to a bearing point of the housing, e.g. by means of a bearing pin, and pivotably hinged to a bearing point of the cross slider, e.g. by means of a bearing pin, such that the cross slider is guided to be moveable on a curved track with respect to the housing. The distance between the bearing point of the housing and the bearing point of the cross slider may be identical for each of the pivotable links. The cross slider may have a cylindrical opening defining the sliding support of a sliding block with a long hole provided in the sliding support receiving the drive pin. As an alternative, the drive pin may be directly guided within the sliding support of the cross slider.

According to an aspect of the present disclosure, the driven shaft is one of the bearing points of the housing. In this respect, the rotary axis of the driven shaft may be the axis about which the at least one pivotable link rotates during use of the device. For transmitting the pivoting movement of the link to the driven shaft, the driven shaft may be rotationally constrained to one of the at least two pivotable links and may further be rotatably guided in the housing. Such a design of the electrically driven device provides for a very compact gear mechanism requiring only a few component parts. For example, the number of the component parts of the gear mechanism between the drive pin and the driven shaft is less than ten, preferably seven or less. The reduce number of component parts compared to other known devices does not only decrease the costs of the device due to less component parts required but also has a beneficial effect on the effort and costs for assembly of the device.

The housing may be a single, unitary component part suitable for encasing and/or mounting further component parts of the device. In other embodiments, the housing may comprise different component parts, for example an outer shell, an insert, a chassis and/or a frame. According to one aspect, the housing may comprise a frame having a first bearing sleeve rotatably guiding the driven shaft and a second bearing sleeve rotatably guiding a bearing pin which is the bearing point of the other of the at least two pivotable links. Such a frame may contribute in guiding and supporting the gear mechanism and the driven shaft. In addition or as an alternative, the housing may comprise a motor support and/or an external housing shell.

The gear mechanism of the electrically driven device may be a mate robust preventing tilting of the pivotable links e.g. if each of the at least two pivotable links comprises two lever sections extending parallel to each other. For example, the lever sections of each link may be connected with each other and may each comprise a bearing sleeve engaging the driven shaft and a bearing pin, respectively.

The electrically driven device may further comprise a sliding block having a bearing receiving the drive pin. For example, the sliding block may be axially guided in the sliding support of the cross slider. In other words, the gear mechanism may work similar to the scotch yoke mechanism translating a continuous rotation of the drive pin into a reciprocating pivoting movement of the cross slider and of the driven shaft. As an alternative to the provision of a sliding block within the cross slider, the drive pin may directly engage the sliding support of the cross slider, e.g. having the form of a slotted hole.

The drive pin may be directly fixed, e.g. welded, to the drive shaft of the motor. As an alternative, a further gear mechanism may be interposed between the drive shaft and the drive pin. For example, a pinion may be rotationally constrained to the drive shaft meshing with a ring gear which carries the drive pin. Such an additional gear mechanism may have benefits regarding an adaption of the voltage or the torque of the motor to the individual requirements of the electrically driven device. If the electrically driven device is a toothbrush, it may comprise a standard DC motor. The motor may have a torque of at least 2 mNm, for example 2.5 mNm, at a speed of 4,800 to 7,200 rpm at a voltage of 3 to 4V. This voltage may be supplied by a Li-Ion battery or any other battery combination providing voltages above 3V and low internal resistance. In addition or as an alternative, the motor may be connected to the mains supply.

According to a further aspect, a sealing may be provided between the driven shaft and the housing, e.g. for preventing contamination of the electronic component parts with dirt and/or humidity. For example, the sealing may permit pivoting of the driven shaft with respect to the housing. In this respect, the sealing may comprise a sealing sleeve often elastically deformable material fixed to the driven shaft and fixed to the housing.

In the embodiment depicted in FIG. 1 a portion of an electrically driven device in the form of an electric toothbrush is shown. The electrically driven device comprises a motor 1 having a drive shaft 2 which defines a first rotary axis I.

In the exemplary embodiment depicted in FIGS. 1 to 5, the drive shaft 2 is directly connected and rotationally constrained to the drive pin 3, e.g. by welding or gluing of the drive pin 3 onto the driven shaft 2. The device further comprises a housing which is not fully shown in the Figures. In FIG. 1 a frame or motor support 4 is shown which receives the motor 1 and which may be permanently connected to a not shown outer housing shell.

The drive pin 3 is rotationally guided in a sliding block 5 which may have at least partially a substantially cylindrical outer shape. The sliding block 5 is guided in a sliding support 6 of a cross slider 7. The sliding support 6 may have the form of a cylindrical hole receiving the sliding block 5. Further, the sliding support 6 may be provided with a long hole at its lower side as seen in FIG. 2 such that the drive pin 3 is able to pass through the cross slider 7 for engaging the sliding block 5.

The cross slider 7 is supported in the housing, e.g. on motor support 4, by means of a first pivotable link 8 and a second pivotable link 9. The cross slider 7 is connected to the pivotable links 8 and 9 by means of bearing points in the form of bearing pins 10. On the opposite side of the respective pivotable links 8 and 9 further bearing points are provided in the form of a bearing pin 11 for pivotable link 8 and a driven shaft 12 forming the bearing pin for pivotable link 9. In other words, the cross slider 7 is supported by means of the pivotable links 8 and 9 such that the cross slider 7 may swivel about the respective bearing points 11 and 12 on a circular path. Due to the small angle of rotation of the cross slider 7, the movement of the cross slider 7 is close to a longitudinal reciprocating movement.

In the exemplary embodiment depicted in FIGS. 1 to 5, each of the pivotable links 8 and 9 comprises two lever sections, namely an upper lever section and a lower lever section as seen in FIGS. 1 and 2, which are connected with each other to form the respective pivotable link. Each off of the lever sections is provided with a hole or bearing sleeve such that the respective pivotable links and engage with the respective bearing points 10, 11, 12 at two positions. This provides for a solid pivotable support of the cross slider 7.

The pivotable link 8 may be rotatable relative to bearing pin 11 or may be rotationally constrained to bearing pin 11. The pivotable link 9 is rotationally constrained to the driven shaft 12 such that rotation of the pivotable link 9 is directly transmitted to the driven shaft 12 which defines a second rotary axis II.

Figure 5:
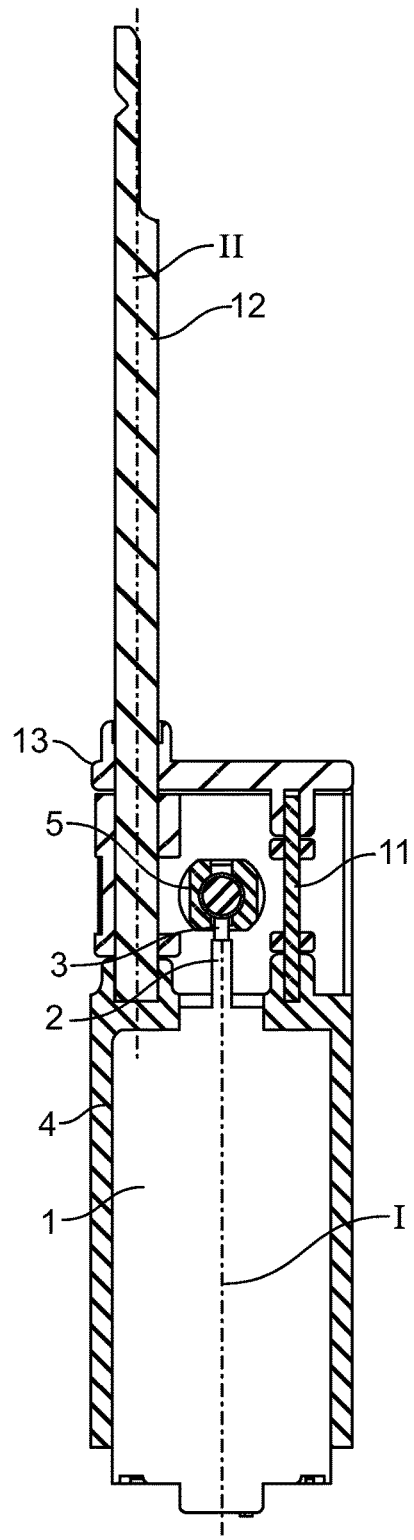
FIG. 5 shows a sectional view of the device of FIG. 1 along line B-B in FIG. 2.

As shown for example in FIG. 2 or 5, a further frame 13 may be provided supporting bearing pin 11 and the driven shaft 12. The frame 13 may be rigidly attached to the motor support 4 and/or to a main housing or outer shell of the device. For example, the frame 13 may be provided with additional bearing sleeves receiving the bearing pin 11 and the driven shaft 12.

In the following, the function of the electrically driven device as depicted in FIGS. 1 to 5 will be explained in more detail. Upon activation of the motor 1 drive shaft 2 rotates about the first rotary axis I and the drive pin 3 rotates eccentrically about the first rotary axis I. The movement of the drive pin 3 is transmitted to the sliding block 5 and cross slider 7. This results in a reciprocating rotation of the cross slider 7 is guided by pivotable links 8 and 9. This movement of the cross slider 7 may be a sinusoidal movement or a substantially sinusoidal movement. Rotation of the cross slider 7 is transmitted via the pivotable links 9 to the driven shaft 12 performing a reciprocating rotation about the second rotary axis II. This reciprocating rotation of the driven shaft 12 may be further transmitted e.g. to the brush head of a toothbrush (not shown in the Figures).

The gear mechanism between the drive pin 3 and the driven shaft 12 of the exemplary embodiment depicted in FIGS. 1 to 5 consists of only seven component parts, namely the sliding block 5, the cross slider 7, the pivotable links 8 and 9, the bearing pins 10 and the bearing pin 11. The number of component parts may be further reduced by omitting the sliding block 5, i.e. by guiding the drive pin 3 directly in a e.g. slotted-like sliding support of the cross slider 7.

Figure 6:
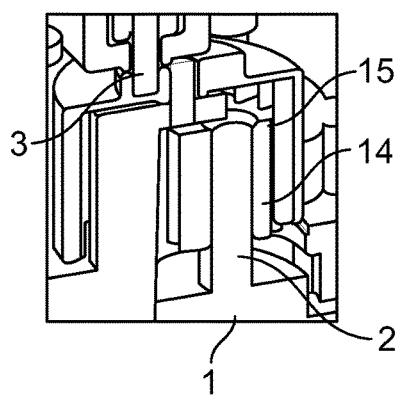
FIG. 6 shows a sectional view of a device according to a further embodiment.

FIG. 6 shows an alternative arrangement of the drive pin 3 with respect to the drive shaft 2 of the motor 1. In this embodiment a further gear mechanism is interposed between the drive shaft 2 and the drive pin 3. In more detail, a pinion 14 is provided on the drive shaft 2 meshing with a ring gear 15 which in turn carries the drive pin 3. The gear ratio between the drive shaft 2 and the drive pin 3 may be adapted as required, e.g. depending from the torque and/or voltage of the motor 1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electrically driven device comprising
a housing (4, 13),
an electric motor (1) mounted in the housing (4, 13) and comprising a drive shaft (2) having a first rotary axis (I),
a driven shaft (12) having a second axis (II) and mounted in the housing (4, 13) for performing a movement relative to the housing (4, 13),
wherein the driven shaft (12) is indirectly coupled to the drive shaft (2) with a gear mechanism converting a rotary motion of the drive shaft (2) into a reciprocating motion of the driven shaft (12),
wherein a drive pin (3) is connected to the drive shaft (2) eccentrically with respect to the rotary axis (I), the gear mechanism comprises a cross slider (7) having a sliding support (6) which extends perpendicular to the first rotary axis (I) and which receives the drive pin (3),
wherein the cross slider (7) is guided in the housing (4, 13) by a parallel lever in the form of a parallelogram with at least two pivotable links (8, 9), and
wherein the driven shaft (12) is coupled to the cross slider (7) by one of the at least two pivotable links (8, 9), thereby converting a rotary motion of the drive shaft (2) into a reciprocating pivoting motion of the driven shaft (12).

2. The electrically driven device according to claim 1, wherein each of the at least two pivotable links (8, 9) is pivotably hinged to a bearing point (11, 12) of the housing (4, 13) and pivotably hinged to a bearing point (10) of the cross slider (7) such that the cross slider (7) is guided to be moveable on a curved track with respect to the housing (4, 13).

3. The electrically driven device according to claim 2, wherein the driven shaft (12) is one of the bearing points (11, 12) of the housing (4, 13).

4. The electrically driven device according to claim 2, wherein the driven shaft (12) is rotationally constrained to one of the at least two pivotable links (8, 9) and is rotatably guided in the housing (4, 13).

5. The electrically driven device according to claim 1, wherein for each of the pivotable links (8, 9) the distance between the bearing point (11, 12) of the housing (4, 13) and the bearing point (10) of the cross slider (7) is identical.

6. The electrically driven device according to claim 1, wherein the housing comprises a frame (13) having a first sleeve rotatably guiding the driven shaft (12) and a second sleeve rotatably guiding a bearing pin (11) which is the bearing point of the other of the at least two pivotable links (8, 9).

7. The electrically driven device according to claim 1, wherein the housing comprises a motor support (4) and an external housing shell.

8. The electrically driven device according to claim 1, wherein each of the at least two pivotable links (8, 9) comprises two lever sections extending parallel to each other.

9. The electrically driven device according to claim 1, wherein a sliding block (5) has a bearing receiving the drive pin (3), wherein the sliding block (5) is axially guided in the sliding support (6) of the cross slider (7).

10. The electrically driven device according to claim 1, wherein the drive pin (3) is directly guided in the sliding support (6) of the cross slider (7).

11. The electrically driven device according to claim 1, wherein the drive pin (3) is directly fixed to the drive shaft (2).

12. The electrically driven device according to claim 1, wherein a pinion (14) is rotationally constrained to the drive shaft (2) meshing with a ring gear (15) which carries the drive pin (3).

13. The electrically driven device according to claim 1, wherein a sealing is provided between the driven shaft (12) and the housing, wherein the sealing permits pivoting of the driven shaft (12) with respect to the housing.

14. The electrically driven device according to claim 1, wherein the gear mechanism converts a continuous rotary motion of the drive shaft (2) into a sinusoidal reciprocating displacement of the cross slider (7).

15. The electrically driven device according to claim 1, wherein the number of the component parts of the gear mechanism between the drive pin (3) and the driven shaft (12) is seven or less.

\* \* \* \* \*